United States Patent
Sano et al.

(10) Patent No.: US 10,470,173 B2
(45) Date of Patent: Nov. 5, 2019

(54) RADIO BASE STATION, USER TERMINAL AND RADIO COMMUNICATION METHOD

(71) Applicant: NTT DOCOMO, INC., Tokyo (JP)

(72) Inventors: Yousuke Sano, Tokyo (JP); Kazuaki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/765,217

(22) PCT Filed: Sep. 30, 2016

(86) PCT No.: PCT/JP2016/078968
§ 371 (c)(1),
(2) Date: Mar. 30, 2018

(87) PCT Pub. No.: WO2017/057655
PCT Pub. Date: Apr. 6, 2017

(65) Prior Publication Data
US 2018/0279270 A1    Sep. 27, 2018

(30) Foreign Application Priority Data
Oct. 2, 2015 (JP) .................................. 2015-197119

(51) Int. Cl.
*H04W 72/04* (2009.01)
*H04B 1/10* (2006.01)
(Continued)

(52) U.S. Cl.
CPC ............ *H04W 72/042* (2013.01); *H04B 1/10* (2013.01); *H04B 7/04* (2013.01); *H04B 7/0413* (2013.01); *H04L 27/26* (2013.01)

(58) Field of Classification Search
CPC combination set(s) only.
See application file for complete search history.

(56) References Cited

U.S. PATENT DOCUMENTS 9,883,464 B2    1/2018  Takeda et al.
2016/0014785 A1  1/2016  Benjebbour et al.
(Continued)

FOREIGN PATENT DOCUMENTS

| JP | 2014-155092 A | 8/2014 |
| JP | 2015-12411 A | 1/2015 |
| JP | 2015-39132 A | 2/2015 |

OTHER PUBLICATIONS

Benjebbour, A. et al.; "System-Level Perfomance of Downlink NOMA Combined with SU-MIMO for Future LTE Enhancements"; Globecom 2014 Workshop, pp. 706-710 (5 pages).
(Continued)

*Primary Examiner* — Ronald B Abelson
(74) *Attorney, Agent, or Firm* — Osha Liang LLP

(57) ABSTRACT

To suppress decrease in throughput even in the case of combining NOMA and MIMO to use, a radio base station according to one aspect of the present invention has a transmission section that transmits a DL signal to each of a plurality of user terminals with a single or a plurality of streams, and a control section that controls so as to perform power multiplexing on DL signals transmitted to the user terminals to transmit, where the control section sets a multiplexing power ratio of the DL signals to perform power multiplexing for each stream.

6 Claims, 16 Drawing Sheets

(51) Int. Cl.
*H04B 7/04* (2017.01)
*H04B 7/0413* (2017.01)
*H04L 27/26* (2006.01)

(56) References Cited

U.S. PATENT DOCUMENTS

2016/0142193 A1    5/2016  Benjebbour et al.
2016/0227521 A1*   8/2016  Han .................... H04W 72/042
2018/0212802 A1*   7/2018  Guo .................. H04L 25/03866

OTHER PUBLICATIONS

3GPP TS 36300 V124.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
International Search Report issued in PCT/JP2016/078968 dated Dec. 20, 2016 (2 pages).
Written Opinion issued in PCT/JP2016/078968 dated Dec. 20, 2016 (4 pages).
Office Action issued in the counterpart Japanese Patent Application No. 2017-543603, dated Aug. 7, 2018 (7 pages).

* cited by examiner

| PATTERN | CELL CENTER PORTION UE#1 | CELL EDGE PORTION UE#2 |
|---|---|---|
| 1 | Rank 1 | Rank 1 |
| 2 | Rank 2 | Rank 1 |
| 3 | Rank 1 | Rank 2 |
| 4 | Rank 2 | Rank 2 |

FIG. 4

|  | MULTIPLEXING POWER RATIO | INTERFERENCE MCS |
|---|---|---|
| STREAM #1 | 0.1 | 16QAM |
| STREAM #2 | 0.3 | QPSK |

FIG. 7A

|  | MULTIPLEXING POWER RATIO | INTERFERENCE MCS |
|---|---|---|
| STREAM #1 | 0.2 | QPSK |
| STREAM #2 | 0.2 | N/A |

FIG. 7B

|  | MULTIPLEXING POWER RATIO |
|---|---|
| STREAM #1 | 0.2 |
| STREAM #2 | N/A |

FIG. 8A

|  | MULTIPLEXING POWER RATIO |
|---|---|
| STREAM #1 | 0.1 |
| STREAM #2 | 0.3 |

FIG. 8B

| Entry | MULTIPLEXING POWER RATIO (STREAM #1) | MULTIPLEXING POWER RATIO (STREAM #2) | |
|---|---|---|---|
| Entry #1 | 0.1 | 0.1 | INTERFERENCE UE IS Rank 2 |
| Entry #2 | 0.1 | 0.3 | |
| Entry #3 | 0.3 | 0.1 | |
| Entry #4 | 0.2 | N/A | INTERFERENCE UE IS Rank 1 |

| Entry | MULTIPLEXING POWER RATIO (STREAM #1) | MULTIPLEXING POWER RATIO (STREAM #2) | INTERFERING MCS (STREAM #1) | INTERFERING MCS (STREAM #2) |
|---|---|---|---|---|
| Entry #1 | 0.1 | 0.1 | 16QAM | 16QAM |
| Entry #2 | 0.1 | 0.3 | 16QAM | QPSK |
| Entry #3 | 0.3 | 0.1 | QPSK | 16QAM |
| Entry #4 | 0.2 | N/A | QPSK | N/A |

Entries #1–#3: INTERFERENCE UE IS Rank 2
Entry #4: INTERFERENCE UE IS Rank 1

FIG. 10B

| TRANSMISSION BIT | CORRESPONDING Entry |
|---|---|
| 00 | Entry #1 |
| 01 | Entry #2 |
| 10 | Entry #3 |
| 11 | Entry #4 |

RADIO BASE STATION, USER TERMINAL AND RADIO COMMUNICATION METHOD

TECHNICAL FIELD

The present invention relates to a radio base station, user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE, successor systems (e.g. also called LTE-A (LTE-Advanced), FRA (Future Radio Access), 4G, 5G and the like) to LTE have been studied.

In LTE/LTE-A, as a downlink radio access scheme, Orthogonal Frequency Division Multiple Access (OFDMA) is used. On the other hand, in the future radio communication systems (from LTE Rel. 13 onward), for the purpose of further increasing the communication capacity, in OFDMA, techniques (MUST: Multiuser Superposition Transmission) have been studied to multiplex signals to a plurality of user terminals into the same radio resources to transmit.

CITATION LIST

Non-Patent Literature

[Non-patent literature 1] 3GPP TS 36.300 "Evolved Universal Terrestrial Radio Access (E-UTRA) and Evolved Universal Terrestrial Radio Access Network (E-UTRAN); Overall description; Stage 2"

SUMMARY OF THE INVENTION

Technical Problem

As a downlink radio access scheme to actualize MUST, considered is Non-Orthogonal Multiple Access (NOMA) based on the premise of interference cancellation on the reception side. In one aspect of NOMA, downlink signals to a plurality of user terminals are superposed on the same radio resources (e.g. time and/or frequency resources), are multiplexed (power-multiplexed) in the power domain, and are transmitted.

Further, it is considered combining the above-mentioned NOMA and MIMO (Multiple-Input Multiple-Output) to use, and thereby performing power multiplexing on signals of a plurality of layers (streams) to further improve spectral usage efficiency. However, generally, the reception quality for each of streams subjected to spatial multiplexing by MIMO is dependent on a propagation environment of the stream, and therefore, there is a problem that the effect of improving throughput by NOMA is not suitably achieved according to the environment.

The present invention was made in view of such a respect, and it is an object of the invention to provide a radio base station, user terminal and radio communication method for enabling decrease in throughput to be suppressed, even in the case of combining NOMA and MIMO to use.

Solution to Problem

A radio base station according to one aspect of the present invention has a transmission section that transmits a DL signal to each of a plurality of user terminals with a single or a plurality of streams, and a control section that controls so as to perform power multiplexing on DL signals transmitted to the user terminals to transmit, where the control section sets a multiplexing power ratio of the DL signals to perform the power multiplexing for each stream.

Technical Advantage of the Invention

According to the present invention, it is possible to suppress decrease in throughput, even in the case of combining NOMA and MIMO to use.

BRIEF DESCRIPTION OF DRAWINGS

FIG. 4 is a diagram to explain combinations of the numbers of streams (Ranks) in 2×2 MIMO;

FIG. 7A is a diagram illustrating one example of notification information in Aspect 1 of this Embodiment; FIG. 7B is a diagram illustrating another example of the notification information in Aspect 1 of this Embodiment;

FIG. 8A is a diagram illustrating one example of notification information in Aspect 2 of this Embodiment; FIG. 8B is a diagram illustrating another example of the notification information in Aspect 2 of this Embodiment;

FIG. 9 is a diagram illustrating one example of notification information in Aspect 3 of this Embodiment; FIG. 10A is a diagram illustrating one example of notification information in Aspect 4 of this Embodiment; FIG. 10B is a diagram illustrating an example of transmission bits corresponding to Entry illustrated in FIG. 10A;

DESCRIPTION OF EMBODIMENTS

Figure 1A:
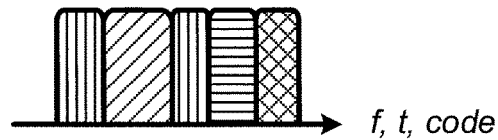
FIG. 1A is a diagram illustrating the conventional radio access scheme.
Figure 1B:
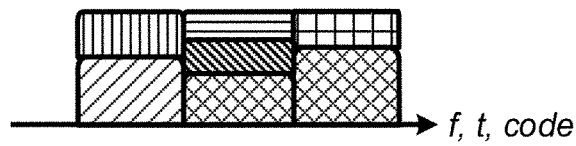
FIG. 1B is diagram to explain NOMA in outline.

FIG. 1 contains schematic explanatory diagrams of NOMA. In the conventional radio access scheme, as illustrated in FIG. 1A, downlink signals to a plurality of user terminals are subjected to orthogonal multiplexing by at least one of the frequency domain (f), time domain (f) and code domain. On the other hand, in NOMA, as illustrated in FIG. 1B, downlink signals to a plurality of user terminals are superposed on the same radio resources (e.g. the same resources in time and frequency), and are non-orthogonally multiplexed (power-multiplexed) in the power domain.

Figure 1C:
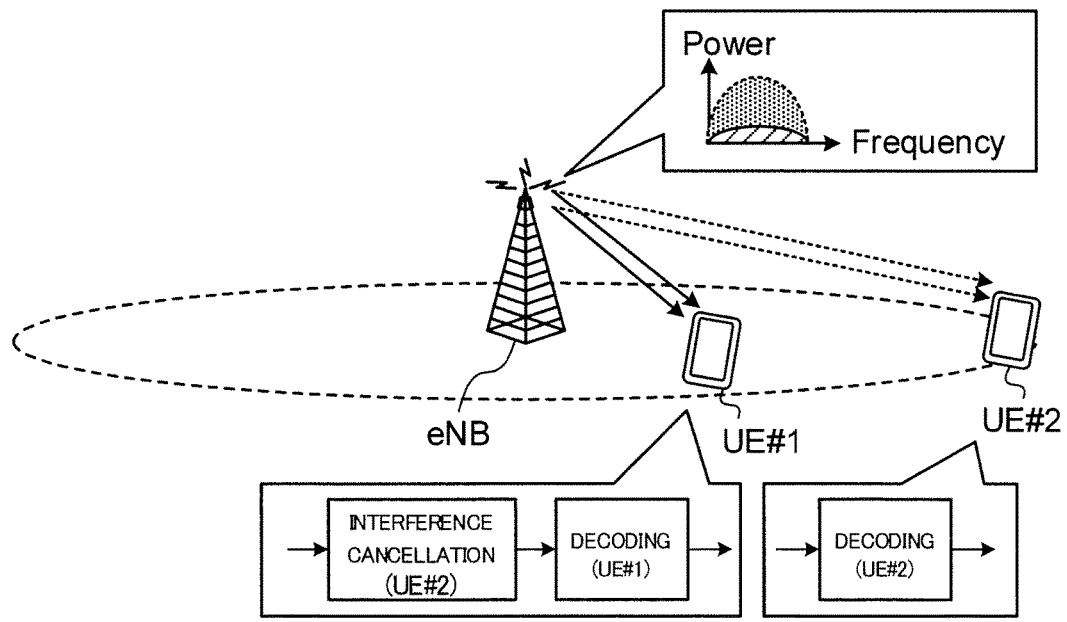
FIG. 1C is a diagram illustrating the case where downlink signals are transmitted to a plurality of user terminals from a radio base station using non-orthogonal multiplexing in NOMA.

FIG. 1C illustrates the case where a radio base station (eNB: eNodeB) transmits downlink signals to a plurality of user terminals (UE: User Equipment) #1 and #2 using non-orthogonal multiplexing. FIG. 1C illustrates the case where the UE#1 is positioned in a center portion (hereinafter, cell center portion) of a cell formed by the eNB, and the UE#2 is positioned in an edge portion (hereinafter, cell edge portion) of the cell. In addition, a plurality of user terminals (UE#1 and UE#2) non-orthogonally multiplexed into the same radio resources may be called pairing terminals.

A path loss of the downlink signal transmitted from the eNB increases, as the distance from the radio base station increases. Therefore, a received SINR (Signal to Interference plus Noise Ratio) of the UE#2 relatively far from the eNB is lower than a received SINR of the UE#1 relatively near the eNB.

In NOMA, by varying transmit power corresponding to channel gain (e.g. received SINR, RSRP (Reference Signal Received Power)), path loss, propagation environment and the like, downlink signals of a plurality of user terminals are non-orthogonally multiplexed into the same (or overlapping) radio resources. For example, in FIG. 1C, downlink signals to the UEs#1 and #2 are multiplexed into the same radio resources with different transmit power. Relatively low transmit power is allocated to the downlink signal to the UE#1 with a high received SINR, and relatively high transmit power is allocated to the downlink signal to the UE#2 with a low received SINR.

Further, in NOMA, by removing an interference signal from a received signal with an inter-user interference canceller, a downlink signal to the terminal is extracted. In this case, among downlink signals non-orthogonally multiplexed into the same radio resources, the interference signal is a downlink signal to another terminal with higher transmit power than that of the downlink signal to terminal. Therefore, by removing the downlink signal to another terminal with the interference canceller, the downlink signal to the terminal is extracted.

For example, the downlink signal to the UE#2 is transmitted with higher transmit power than that of the downlink signal to the UE#1. Therefore, the UE#1 positioned in the cell center portion receives the downlink signal to the UE#2 non-orthogonally multiplexed into the same radio resources as the interference signal, in addition to the downlink to the UE#1. The UE#1 removes the downlink signal to the UE#2 with the interference canceller, and is thereby capable of extracting the downlink signal to the UE#1 to properly decode.

On the other hand, the downlink signal to the UE#1 is transmitted with lower transmit power than that of the downlink signal to the UE#2. Therefore, in the UE#2 in the cell edge portion, since the effect of interference by the downlink signal to the UE#1 non-orthogonally multiplexed into the same radio resources is relatively small, the UE#2 is capable of processing interference as white noise without performing interference cancellation with the interference canceller, and of extracting the downlink signal to the UE#2 to properly decode.

As the interference canceller, for example, considered are CWIC (Code Word level Interference Canceller) and R-ML (Reduced complexity-Maximum Likelihood detector). The CWIC is a successive interference canceller (SIC: Successive Interference Cancellation) type, and is also called turbo SIC.

In the case of using the CWIC, the UE#1 performs processing up to turbo decoding on the downlink signal (interference signal) to the UE#2. The UE#1 generates a replica signal of interference based on the turbo decoding result and channel estimation result, subtracts the generated replica signal from the received signal, and extracts the downlink signal to the UE#1. On the other hand, in the case of using the R-ML, the UE#1 does not perform turbo decoding on the downlink signal (interference signal) to the UE#2, and performs maximum likelihood detection concurrently on downlink signals to both of the UEs#1 and #2.

Further, the CWIC is also applicable to the case of multiplying the downlink signals to the UEs#1 and #2 by respective different precoding matrixes (PMs). On the other hand, in the R-ML, in the case of applying respective different precoding matrixes to the downlink signals of the UEs#1 and #2, since spatial versatility in the user terminal lacks, there is a case that characteristics deteriorate. In addition, the precoding matrix may be called a precoding weight, precoding vector, precoder and the like.

Figure 2:
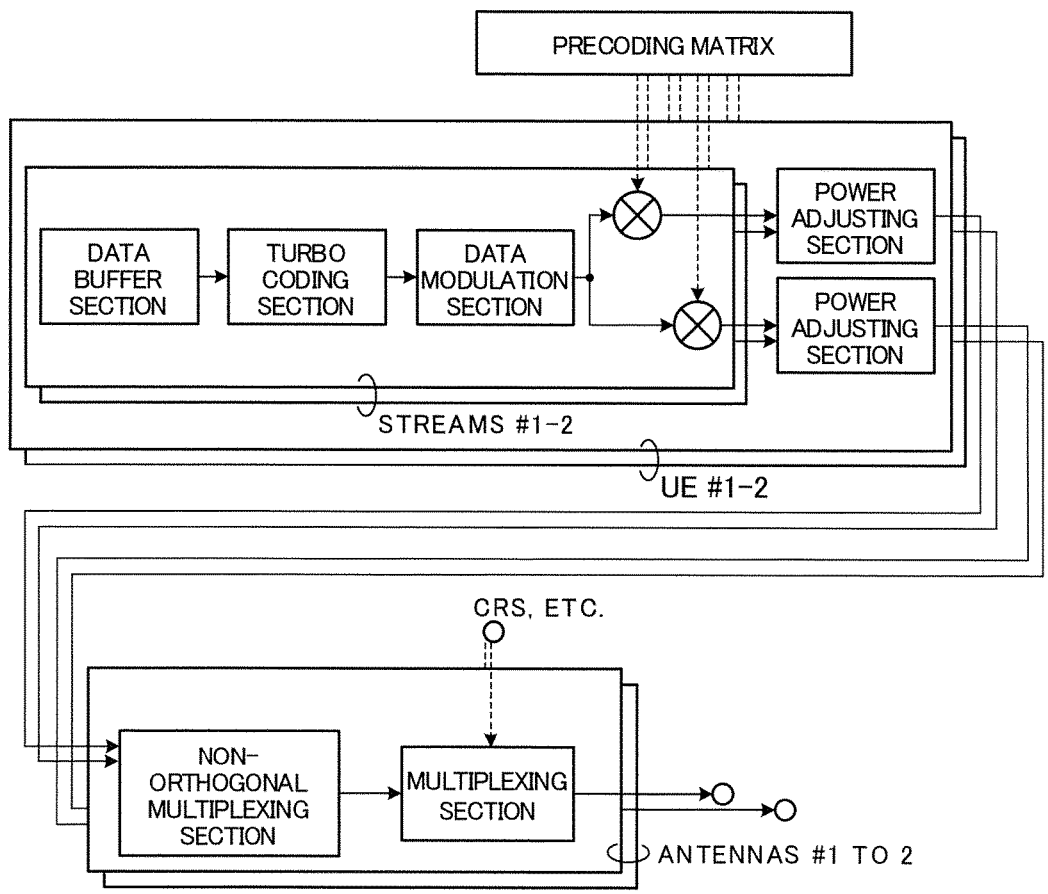
FIG. 2 is a diagram illustrating one example of a configuration of the radio base station (receiver) in NOMA.

Referring to FIGS. 2 and 3, described is one example of configurations of the eNB and UEs#1 and #2 illustrated in FIG. 10. This example illustrates an example where the user terminal performs channel estimation using a Cell-specific Reference Signal (CRS), and the user terminal may perform channel estimation based on another signal.

FIG. 2 is a diagram illustrating one example of the configuration of the radio base station (transmitter). In addition, FIG. 2 illustrates the configuration of 2×2 MIMO (Multiple-Input Multiple-Output), but the invention is not limited thereto. For example, the configuration of the radio base station (transmitter) may be a configuration of 4×4 MIMO, or a configuration other than MIMO. Further, FIG. 2 describes the configuration of the radio base station according to transmission processing, and the radio base station is assumed to be provided with necessary configurations as well as the configuration.

As illustrated in FIG. 2, for each of the UEs#1 and #2, the radio base station performs coding (turbo coding) on data to streams #1 and #2 (Layers #1 and #2), modulates, and subsequently, multiplies by precoding matrixes. Then, the radio base station performs non-orthogonal multiplexing on modulated signals to the UEs#1 and #2 subsequent to power adjustment to multiplex with a control signal, CRS and the like. The station transmits the multiplexed signal as the downlink signal via a plurality of antennas #1 and #2.

Figure 3A:
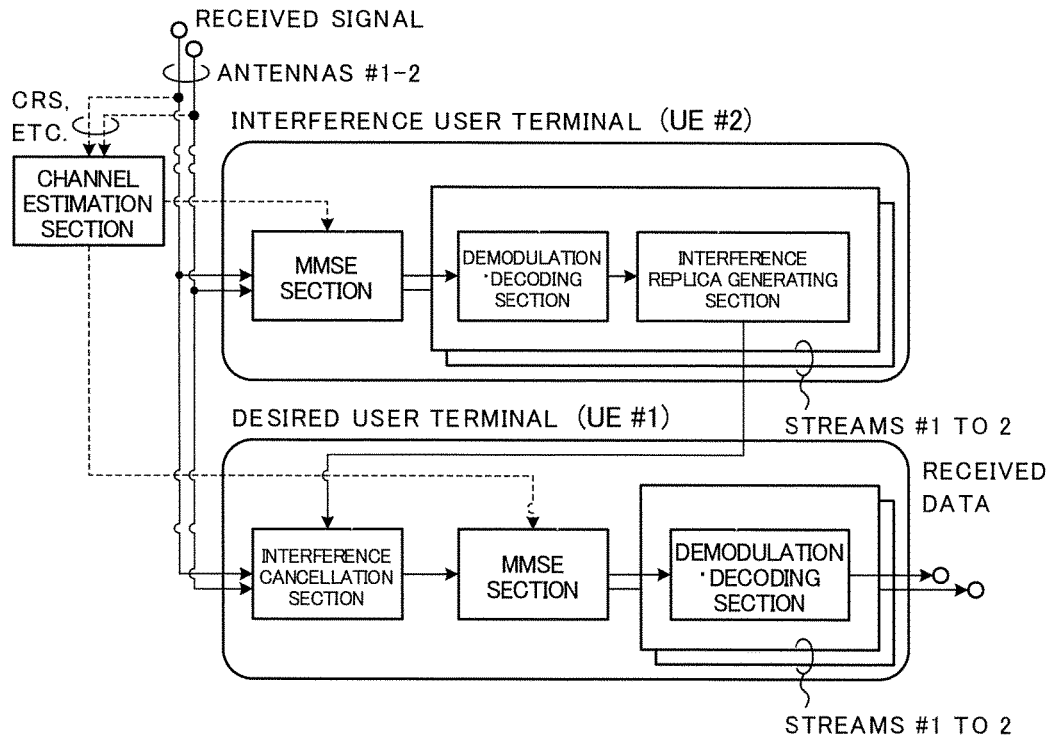
FIG. 3A is a diagram illustrating one example of a configuration of a user terminal (receiver) which performs interference cancellation in NOMA.
Figure 3B:
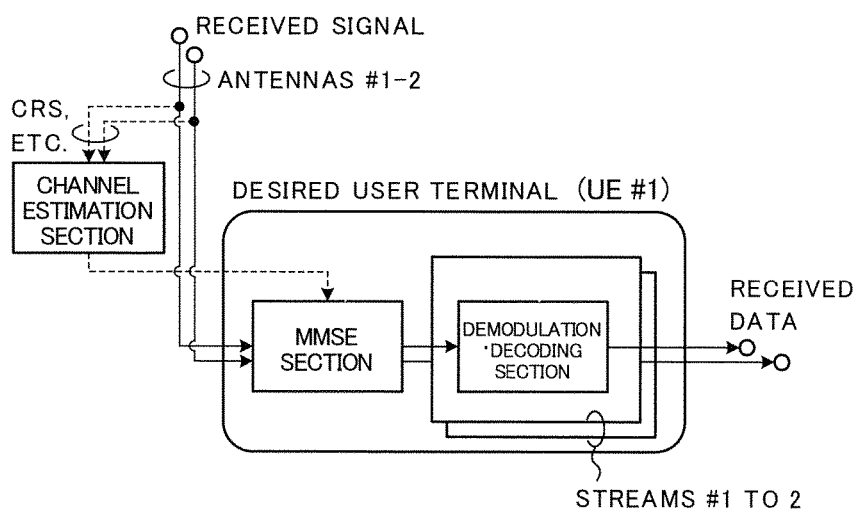
FIG. 3B is a diagram illustrating one example of a configuration of a user terminal which does not perform interference cancellation.

FIG. 3 contains diagrams illustrating one example of configurations of user terminals (receivers) in NOMA. The user terminals of FIG. 3 receive the downlink signals from the radio base station illustrated in FIG. 2. FIG. 3A illustrates one example of the configuration of the UE#1 in the cell center portion which performs interference cancellation, and FIG. 3B illustrates one example of the configuration of the UE#2 in the cell edge portion which does not perform interference cancellation. In addition, each of FIGS. 3A and 3B describes the configuration of the UE according to reception processing, and the UE is assumed to be provided with necessary configurations as well as the configuration.

Further, FIG. 3A illustrates the configuration using the SIC type interference canceller such as the CWIC, but the invention is not limited thereto, and a configuration using the R-ML as the interference canceller may be adopted. As illustrated in FIG. 3A, into the received signal in the UE#1 for performing interference cancellation are non-orthogonally multiplexed the downlink signal to the UE#1 (desired UE) and the downlink signal to the other UE#2 (interference UE).

The UE#1 estimates the downlink signal to the UE#2 to remove, and thereby extracts the downlink signal to the UE#1. Specifically, as illustrated in FIG. 3A, in a channel estimation section, the UE#1 performs channel estimation using the CRS multiplexed into the received signal. Then, in an MMSE (Minimum Mean Square Error) section, the UE#1 obtains the downlink signal to the UE#2 by a least square method, based on the result (channel matrix) of channel estimation and the received signal. Further, the UE#1 performs demodulation and decoding (turbo decoding) on the downlink signal to the UE#2 to generate a replica signal (interference replica).

Using the replica signal of the UE#2, the UE#1 obtains the downlink signal to the terminal (UE#1). Specifically, the UE#1 subtracts the replica signal of the UE#2 from the received signal in an interference cancellation section to output to the MMSE section. Then, in the MMSE section, the UE#1 estimates the downlink signal of the UE#1 by the least square method, based on the above-mentioned result (channel matrix) of channel estimation and an output signal from the interference cancellation section. By demodulating and decoding the estimated signal, the UE#1 acquires data (received data) toward the UE#1.

On the other hand, as illustrated in FIG. 3B, the UE#2 in the cell edge portion obtains the downlink signal to the terminal (UE#2), without performing interference cancellation. Specifically, in a channel estimation section, the UE#2 performs channel estimation using the CRS multiplexed into the received signal. Then, in an MMSE section, the UE#2 estimates the downlink signal to the UE#2 by the least square method, based on the result (channel matrix) of channel estimation and the received signal. The UE#2 demodulates and decodes the estimated modulated signal, and thereby acquires data (received data) of the UE#2.

In addition, FIGS. 3A and 3B illustrate the configurations of the UEs respectively in the cell center portion and the cell edge portion in a functional manner, and the configuration of the UE is not limited thereto. For example, a single UE is capable of being provided with both configurations illustrated in FIGS. 3A and 3B. Further, interference cancellation is not limited to the cell center portion, and may be performed in the cell edge portion.

As described above, in the case of performing non-orthogonal multiplexing on downlink signals to a plurality of UEs to transmit, it is expected that the radio base station controls the precoding matrix and Modulation and Coding Scheme (MCS) applied to each downlink signal, based on feedback information from each UE. Such control based on feedback from the user terminal is also called closed loop control.

In closed loop control, the UE transmits Channel State Information (CSI) to the radio base station as feedback. The CSI includes information on at least one of Precoding Matrix Indicator (PMI) to identify the precoding matrix, Precoding Type Indicator (PTI), Rank Indicator (RI) to identify the Rank (the number of layers), and Channel Quality Indicator (CQI) to identify the channel quality.

Specifically, the UE transmits a PMI indicative of an optimal precoding matrix, RI indicative of an optimal Rank in the case of assuming the PMI, and CQI indicative of the channel quality in the case of assuming the PMI and RI as feedback. In addition, each UE may select the PMI indicative of the optimal precoding matrix, from a codebook that associates the PMI and precoding matrix with each other. Further, the optimal PMI may be determined based on a propagation environment and the like.

Using the MCS associated with the CQI transmitted as feedback, the radio base station performs modulation•coding on a downlink signal to each UE. Further, the radio base station multiplies the downlink signal to each UE by the precoding matrix indicated by the PMI transmitted as feedback. Furthermore, the radio base station transmits the downlink signal to each UE by the Rank (the number of layers) indicated by the RI transmitted as feedback.

In addition, in the case of applying the MIMO configuration as described above, a plurality of combinations of the numbers of streams (Ranks) exists which is applied to a plurality of user terminals that receives power-multiplexed signals. For example, in the case of the above-mentioned 2×2 MIMO configuration, as the combination of the numbers of streams (Ranks) of the UE#1 and UE2, four patterns exist as illustrated in FIG. 4. Generally, the reception quality for each stream subjected to special multiplexing by MIMO is dependent on the propagation environment of the stream. Therefore, in patterns 2 to 4 in FIG. 4, there is a possibility that a phenomenon such that the reception quality is low in a stream #1, while being high in a stream #2 or the inverse phenomenon occurs. Further, in LTE, in the case where MIMO is applied, an optimal CQI for each stream is transmitted to the radio base station as feedback.

However, it has conventionally not been studied controlling NOMA in consideration of propagation environments of streams of MIMO. Therefore, when the conventional radio communication system is used, in the case of combining NOMA and MIMO to use, there is a problem that proper power multiplexing is not performed, and that the effect of improving throughput by NOMA is not suitably achieved.

Therefore, the inventors of the present invention conceived setting an appropriate multiplexing power ratio and/or MCS for each stream, in the case of combining NOMA and MIMO to use. Further, the inventors reached providing information required to operate an interference canceller properly for each stream in a user terminal.

According to one Embodiment of the present invention, in the case of combining NOMA and MIMO to use, it is possible to efficiently use characteristics of MIMO for performing spatial multiplexing on signals with a plurality of streams, and to operate NOMA properly.

One Embodiment of the present invention will be described below in detail. In this Embodiment, as one example, it is assumed that a user terminal receives a downlink signal using the NOMA scheme, but the invention is not limited thereto. As long as the downlink signal received in the user terminal is a downlink signal multiplexed (power-multiplexed) into the same radio resource as that of a downlink signal to another user terminal, the downlink signal may be any signal. For example, the present invention is applicable to downlink signals using other schemes specified as MUST.

Further, in the following description, it is assumed that the downlink signal using the NOMA scheme is a signal such that an OFDMA signal is subjected to non-orthogonal multiplexing in the power domain in the same radio resources (same time and frequency resources), but the invention is not limited thereto. The downlink signal subjected to non-orthogonal multiplexing by the NOMA scheme is not limited to the OFDMA signal, and may be any signal multiplexed in at least one of the frequency domain (f), time domain (t) and code domain.

Furthermore, in the following description, transmission modes (TMs) (e.g. transmission modes 2-6) are assumed where data demodulation is performed using the CRS, but the invention is not limited thereto. This Embodiment is applicable to transmission modes (e.g. transmission modes 7-9) where data demodulation is performed using a demodulation reference signal (DMRS: DeMudulation Reference Signal), a transmission mode (e.g. transmission mode 10) where a downlink signal is received from a plurality of radio base stations (cells) using Coordinated MultiPoint (CoMP), and other transmission modes.

Still furthermore, in the following description, it is assumed that interference measurement (measurement of the channel state, propagation environment and the like) in the user terminal is performed based on the CRS, but the invention is not limited thereto. Interference measurement may be performed based on a Channel State Information-Reference Signal (CSI-RS), or may be performed based on another signal. In addition, in the case of using the CRS, as compared with the case of using the CSI-RS such as the transmission mode 10, there is the advantage in the respect that it is not necessary to beforehand notify of information (CSI-RS/CSI-IM (interference measurement)) indicative of resources to measure by higher layer signaling.

Moreover, in this Embodiment, from the viewpoint of reducing the reception processing load, it is suitable to use the R-ML as the interference canceller. However, the invention is not limited thereto, and it is also possible to apply the SIC type interference canceller such as the CWIC. Further, in this Embodiment, it is assumed that the number of a plurality of user terminals (pairing terminals) non-orthogonally multiplexed into the same radio resources is "2", but the invention is not limited thereto, and three or more user terminals may be grouped to non-orthogonally multiplex into the same radio resources.

Figure 5:
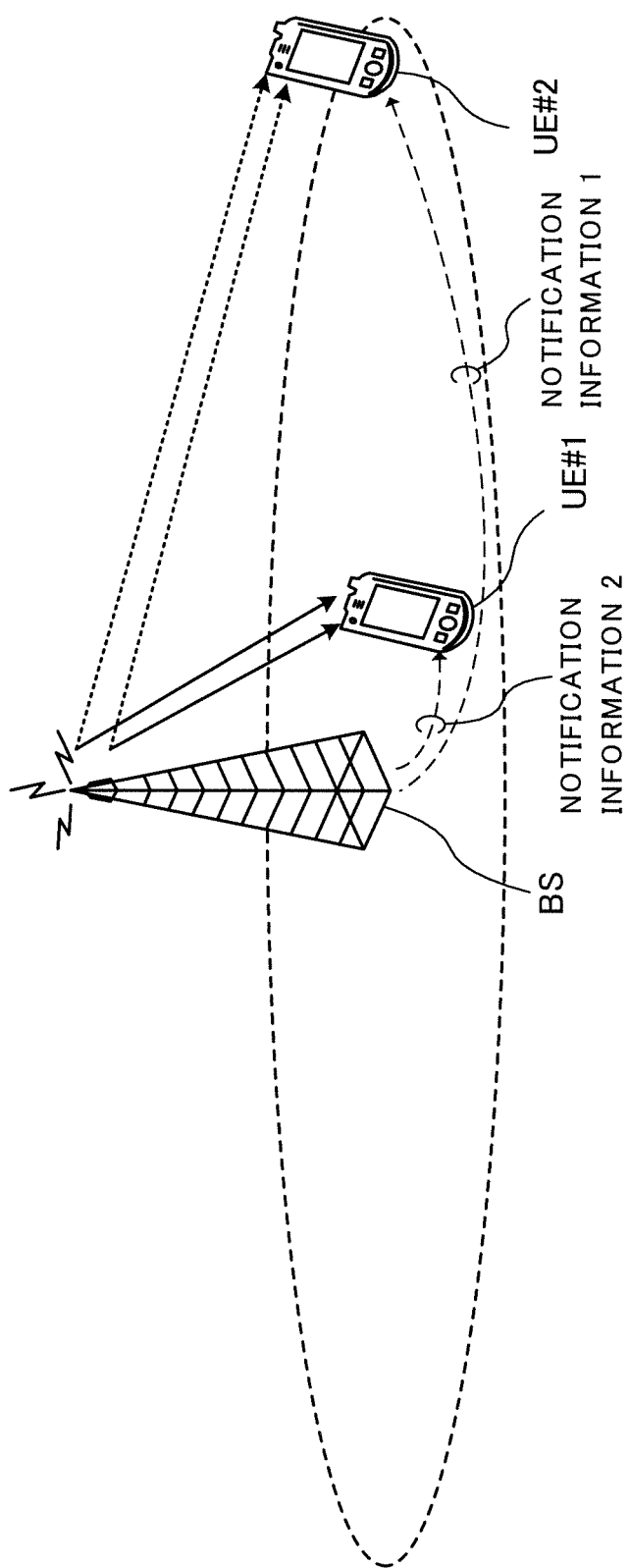
FIG. 5 is a diagram to explain a DL signal and notification information in this Embodiment.

FIG. 5 is a diagram to explain the case of combining NOMA and MIMO according to this Embodiment. FIG. 5 illustrates a radio base station BS and user terminals UE#1 and UE#2 in one Embodiment the present invention. The radio base station BS transmits DL signals to the user terminal UE#1 by Rank 2 i.e. two streams. Further, similarly, DL signals are transmitted to the user terminal UE#2 also by two streams. The DL signals to the user terminal UE#1 and DL signals to the user terminal UE#2 are power-multiplexed for each stream. In addition, notification information will be described later.

(In Regard to Multiplexing Power Ratio, MCS and Rank)

The radio base station BS determines the multiplexing power ratio for each stream. For example, the multiplexing power ratio in some stream is that {UE#1, UE#2}={0.8P, 0.2P}. For example, P is total power capable of being allocated. In this case, it is suitable that the sum (i.e. total transmit power) of each numeric value indicative of the multiplexing power ratio is set not to exceed a predetermined value (e.g. 1).

With respect to such a multiplexing power ratio, the radio base station BS is capable of setting the ratio so as to maximize scheduling metric (e.g. PF (Proportional Fairness) metric) based on the CQI and RI transmitted from each user terminal as feedback for each stream. Further, as in the power ratio, also with respect to the MCS and Rank, the radio base station BS is capable of setting based on the CQI and RI transmitted from each user terminal as feedback for each stream.

(In Regard to Notification Information)

The notification information is information required to perform interference cancellation between user terminals with NOMA applied thereto. As illustrated in FIG. 5, the radio base station BS is capable of transmitting, to the user terminal UE#1, information (notification information 2) on the user terminal UE#2 that is the interference terminal (interference UE) to the user terminal UE#1. The notification information indicates at least the multiplexing power ratio for each stream, and details thereon will be described later as a plurality of Aspects. Further, the radio base station BS is capable of transmitting, to the user terminal UE#2, information (notification information 1) on the user terminal UE#1 that is the interference UE to the user terminal UE#2.

The notification information may be included in a downlink control signal (e.g. DCI (Downlink Control Information)) to be dynamically notified to the user terminal, via a downlink control channel (e.g. PDCCH (Physical Downlink Control Chanel), EPDCCH (Enhanced PDCCH)). Further, the notification information may be notified semi-statically by higher layer signaling (e.g. RRC (Radio Resource Control) signaling). Furthermore, such notification information may be configured to be notified to only the user terminal that performs interference cancellation. In the example illustrated in FIG. 5, to the user terminals UE#1 and UE#2 are transmitted the notification information (PMI, RI, (MCS)) on the interference terminal for each of respective streams.

(In Regard to Interference Cancellation)

According to the notification information notified from the radio base station BS, each of the user terminals #1 and #2 operates (executes) the inter-user interference canceller.

Figure 6:
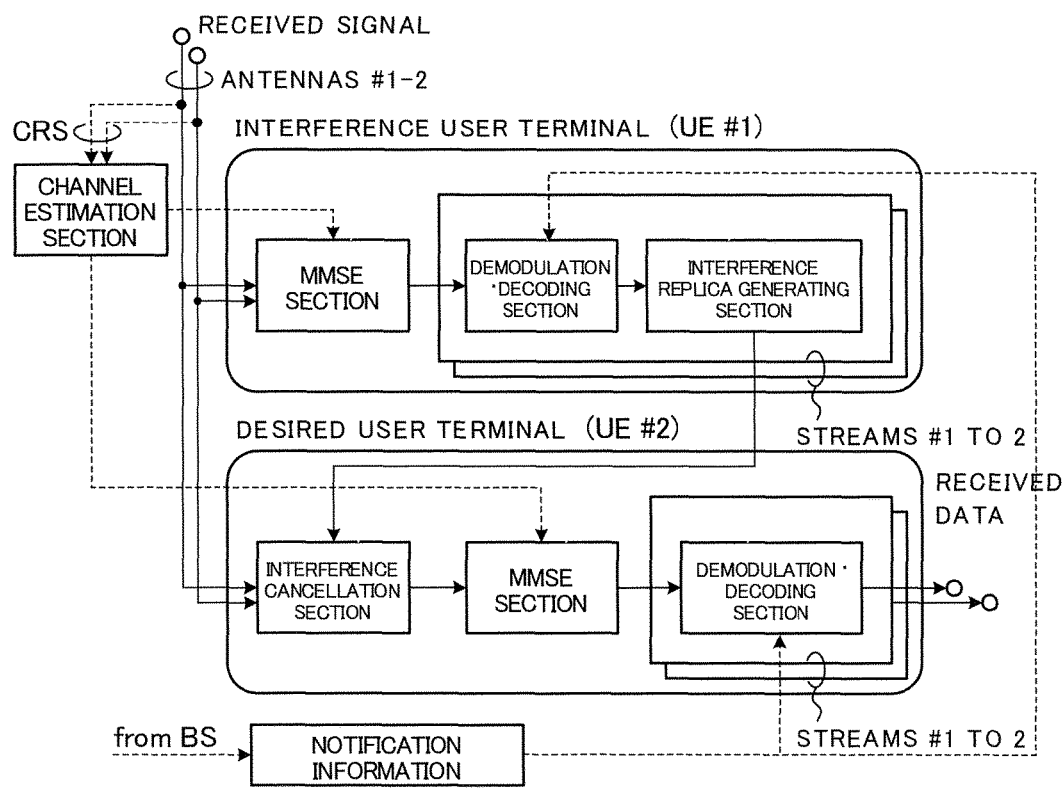
FIG. 6 is a diagram illustrating one example of a configuration of a user terminal in this Embodiment.

FIG. 6 is a diagram illustrating one example of the user terminal according to one Embodiment the present invention. The user terminal illustrated in FIG. 6 describes a configuration according to reception processing of the user terminal UE#2 of FIG. 5, and may be provided with necessary configurations as appropriate as well as the configuration.

Using the notification information notified for each stream, the user terminal UE#2 operates (executes) the inter-user interference canceller. For example, in FIG. 6, the UE#2 removes a modulated signal of the user terminal UE#1 from a received signal, and is capable of acquiring a modulated signal of the user terminal UE#2.

Thus, according to this Embodiment, in the case of combining NOMA and MIMO to use, since it is possible to set an appropriate multiplexing power ratio for each stream, it is possible to suppress decrease in throughput. Further, since the user terminal is provided with the information required to properly operate the interference canceller for each stream, on the user terminal side, it is possible to operate the interference canceller properly for each stream, and acquire a signal to the terminal. For example, in a DL signal received in some stream, even when a power ratio of another user terminal is larger than a power ratio assigned to the terminal, the user terminal is capable of appropriately acquiring the signal to the terminal.

With respect to the notification information notified to the user terminal, specific configurations will be described next as Aspects 1 to 4. In addition, the notification information is not limited to these configurations of the Aspects.

(Aspect 1)

Aspect 1 will be described with reference to FIG. 7. In Aspect 1, the multiplexing power ratio and the MCS of the interference UE (user terminal for receiving a signal that is interference to the user terminal to which the information is notified) are explicitly notified. For example, the notification information illustrated in FIG. 7A indicates that for the stream #1 the multiplexing power ratio allocated to the terminal is "0.1", and that the DL signal transmitted to the interference UE is modulated and coded by 16QAM (Quadrature Amplitude Modulation), and further indicates that for the stream #2 the multiplexing power ratio allocated to the terminal is "0.3", and that the DL signal transmitted to the interference UE is modulated and coded by QPSK (Quadrature Phase Shift Keying). Such notification information represents that the Rank of the interference UE is "2".

According to the notification information that the multiplexing power ratio is "0.1", and that the DL signal transmitted to the interference UE is modulated and coded by 16QAM, the user terminal operates the inter-user interference canceller on the DL signal received with the stream #1, and removes the DL signal to the interference UE. By this means, the user terminal is capable of demodulating the signal to the terminal from the DL signal received with the stream #1.

In addition, when the user terminal beforehand recognizes that total transmit power is set not to exceed a predetermined value, the user terminal is capable of obtaining the multiplexing power ratio of the interference UE from the multiplexing power ratio. For example, when the predetermined value is "1", the user terminal is capable of obtaining that the multiplexing power ratio of the interference UE is "0.9" (=1-0.1) from the multiplexing power ratio (0.1). Similarly, also for the stream #2, the user terminal removes the signal to the interference UE, and is capable of demodulating the signal to the terminal from the DL signal received with the stream #2.

Described next is the case where the notification information illustrated in FIG. 7B is notified to the user terminal. In FIG. 7B, it is indicated that for the stream #1 the multiplexing power ratio allocated to the terminal is "0.2", and that the MCS of the DL signal to the interference UE is QPSK, and is further indicated that for the stream #2 the multiplexing power ratio allocated to the terminal is "0.2", and that the MCS of the DL signal to the interference UE is not applied (N/A). Since the modulation and coding scheme of the stream #2 is not applied, such notification information represents that the interference UE is of Rank 1. The user terminal removes the signal to the interference UE only for the stream #1, and is capable of demodulating the signal to the terminal from the DL signal received with the stream #1. For the stream #2, without operating the inter-user interference canceller, the user terminal demodulates the signal to the terminal from the DL signal received with the stream #2.

As described above, according to Aspect 1, since the multiplexing power ratio and the MCS of the interference UE are explicitly notified, and further, the Rank of the interference UE is implicitly notified, the user terminal is capable of operating the interference canceller properly for each stream.

In addition, in Aspect 1, it is assumed that the multiplexing power ratio included in the notification information is the multiplexing power ratio allocated to the terminal that receives the notification information, but the invention is not limited thereto. For example, the multiplexing power ratio included in the notification information may be the multiplexing power ratio allocated to the interference UE. In this case, the user terminal may obtain the multiplexing power ratio allocated to the terminal from the multiplexing power ratio allocated to the interference UE. Further, for the multiplexing power ratio of the stream #2 in FIG. 7B, no application (N/A) is notified. In the other Aspects, the multiplexing power ratio included in the notification information may be interpreted similarly.

In addition, in Aspect 1, the user terminal determines the Rank of the interference UE, based on the MCS (interference MCS) and/or the multiplexing power ratio, and for example, information on the Rank of the interference UE may be explicitly included in the notification information and notified.

(Aspect 2)

Aspect 2 will be described with reference to FIG. 8. In Aspect 2, information on the multiplexing power ratio of each stream is notified. In other words, the multiplexing power ratio of each stream is explicitly notified. In Aspect 2, in applying NOMA, the radio base station is configured to use a beforehand determined (fixed) MCS in the DL signal of the interference UE. On the other hand, on the assumption that the MCS Of the interference UE is used fixedly without being dependent on an environment, the user terminal performs reception processing. For example, the user terminal may perform the reception processing, while assuming that the MCS of the interference UE is fixed to QPSK, or may assume that the MCS is fixed to another MCS. Further, for each stream, the MCS used fixedly may vary. The user terminal is also capable of performing blind estimation on the MCS of the interference UE to perform the reception processing.

The notification information illustrated in FIG. 8A indicates that the multiplexing power ratio allocated to the terminal is "0.2" for the stream #1, and is not applied (N/A) for the stream #2. In addition, when the multiplexing power ratio of a predetermined stream is N/A, the user terminal may determine that the corresponding stream of the interference terminal is not transmitted (or is not used). Further, when the corresponding stream of the interference terminal is not transmitted, the user terminal may acquire the multiplexing power ratio of the corresponding stream of the terminal based on the multiplexing power ratio of another stream, or may assume the ratio is a predetermined value (e.g. "1") related to total transmit power. The definition of such "no application (N/A)" of the multiplexing power ratio applies to the other Aspects.

The notification information as illustrated in FIG. 8A represents that the interference UE is of Rank 1. The user terminal removes the signal to the interference UE only for the stream #1, and is capable of demodulating the signal to the terminal from the DL signal received with the stream #1. For the stream #2, without operating the inter-user interference canceller, the user terminal demodulates the signal to the terminal from the DL signal received with the stream #2.

The notification information illustrated in FIG. 8B indicates that the multiplexing power ratio allocated to the terminal for the stream #1 is "0.1", and that the multiplexing power ratio allocated to the terminal for the stream #2 is "0.3". Such notification information represents that the interference UE is of Rank 2. For each of the streams #1 and #2, the user terminal removes the signal to the interference UE, and demodulates the signal to the terminal.

As described above, according to this Aspect 2, since it is assumed that the MCS of the interference UE is fixed, it is possible to make the notification information transmitted from the radio base station a small information amount. Accordingly, it is possible to suppress overhead of communication.

In addition, in Aspect 2, the user terminal determines the Rank of the interference UE based on the multiplexing power ratio, and for example, information on the Rank of the interference UE may be explicitly included in the notification information and notified.

(Aspect 3)

Aspect 3 will be described with reference to FIG. 9. In Aspect 3, the MCS of the interference UE is fixed, and the multiplexing power ratio for each stream is subjected to joint encoding and is notified. FIG. 9 illustrates a plurality of combinations (correspondence relationship between Entry and the multiplexing power ratio) between a predetermined index (e.g. may be called Entry) and the multiplexing power ratio for each stream.

As illustrated in FIG. 9, on each of Entries #1 to #4 are set the multiplexing power ratio of the stream #1 and the multiplexing power ratio of the stream #2. Entries #1 to #3 represent that the interference Rank is "2". Entry #4 represents that the interference Rank is "1". Each multiplexing power ratio is subjected to joint encoding to be notified to the user terminal. In addition, the correspondence relationship in FIG. 9 is defined by four Entries, but the number of Entries defined in the correspondence relationship is not limited thereto.

The correspondence relationship between the Entry and the multiplexing power ratio may be beforehand defined in the user terminal and/or the radio base station, or information on the correspondence relationship may be notified to the user terminal by higher layer signaling (e.g. RRC signaling). Further, for example, information (identification information) to identify one of Entries #1 to #4 is notified with the downlink control signal (e.g. PDCCH and EPD-CCH). The user terminal receiving such notification information demodulates the signal to the terminal for each stream based on the notification information. Demodulation is the same as in the above-mentioned Aspects 1 and 2, and therefore, the description is omitted.

The MCS is fixed as in the above-mentioned Aspect 2. In applying NOMA, the radio base station is configured to use a beforehand determined (fixed) MCS in the DL signal to the interference UE. On the other hand, on the assumption that the MCS Of the interference UE is used fixedly without being dependent on an environment, the user terminal performs reception processing. For example, the user terminal may perform the reception processing, while assuming that the MCS of the interference UE is fixed to QPSK, or may assume that the MCS is fixed to another MCS. Further, for each stream, the MCS used fixedly may vary. The user terminal is also capable of performing blind estimation on the MCS of the interference UE to perform the reception processing.

As described above, according to Aspect 3, only by notifying of the information to identify the Entry, the user terminal is capable of properly operating the interference canceller for each stream. Therefore, with a small information amount (identification information), it is possible to identify the Entry (combination of multiplexing power ratios for each stream), and it is possible to suppress overhead of communication.

In addition, in Aspect 3, the user terminal determines the Rank of the interference UE based on the Entry (or MCS (interference MCS) and/or the multiplexing power ratio), and for example, information on the Rank of the interference UE may be explicitly included in the notification information and notified.

(Aspect 4)

Aspect 4 will be described with reference to FIG. 10. In Aspect 4, to a target user terminal is beforehand notified information (advance information, FIG. 10A) on combinations of the multiplexing power ratio and MCS for each stream in the case of performing power multiplexing on DL signals of a plurality of terminals. The target user terminal is also notified of information to identify the combination of FIG. 10A. FIG. 10A illustrates a plurality of combinations (correspondence relationship between the Entry and the multiplexing power ratio and MCS) of a predetermined index (Entry), and the multiplexing power ratio and MCS for each stream. In addition, the notified advance information may be the same in all user terminals, or may be different for each user terminal. Further, the notified advance information may be varied dynamically corresponding to a reception environment of the user terminal, for example, by re-notification.

As illustrated in FIG. 10A, on each of Entries #1 to #4 are beforehand set the multiplexing power ratio of the stream #1, the multiplexing power ratio of the stream #2, the MCS of the interference UE of the stream #1, and the MCS of the interference UE of the stream #2. Entries #1 to #3 represent that the interference Rank is "2". Entry #4 represents that the interference Rank is "1". The set description (advance information, information on the correspondence information) of each Entry is subjected to joint encoding, and is notified to the user terminal by higher layer signaling (e.g. RRC signaling).

Further, as illustrated in FIG. 10B, the Entries #1 to #4 of FIG. 10A are identified by 2 bits of information (identification information, information on a particular combination). Such information is notified to the targeted user terminal on the PDCCH. By this means, it is possible to dynamically notify of the identification information. According to the identification information, the user terminal is capable of determining the multiplexing power ratio, interference MCS and Rank of the interference UE. Based on the notification information, the user terminal demodulates the signal to the terminal for each stream. Demodulation is the same as in the above-mentioned Aspects 1 and 2, and therefore, the description is omitted.

In this Aspect, the MCS of the interference UE is notified, and as in the above-mentioned Aspects 2 and 3, the MCS may be fixed (e.g. the MCS of the interference UE is fixed to QPSK.) Alternatively, the MCS may be estimated by blind decoding.

As described above, according to Aspect 4, with a small information amount (identification information), it is possible to identify the Entry (combination of the multiplexing power ratio of the stream #1, the multiplexing power ratio of the stream #2, the MCS of the interference UE of the stream #1, and the MCS of the interference UE of the stream #2) in the advance information, and it is possible to suppress overhead of communication.

In addition, in Aspect 4, the user terminal determines the Rank of the interference UE based on the Entry (or MCS (interference MCS) and/or the multiplexing power ratio), and for example, information on the Rank of the interference UE may be explicitly included in the notification information and notified.

Further, in this Embodiment, the description is given, while assuming that a plurality of user terminals (pairing terminals of NOMA) subjected to power multiplexing is the same as a plurality of terminals to which DL signals are transmitted with a single or a plurality of streams in MIMO, but the invention is not limited thereto. Even when a plurality of user terminals subjected to power multiplexing does not match with a plurality of terminals in MIMO, it is essential only that the information (notification information) on the interference UE is transmitted to a user terminal that operates the interference canceller.

Furthermore, in Aspects 2 and 3 of this Embodiment, the example where the MCS of the interference UE is fixed is illustrated, but the invention is not limited thereto. For example, the MCS may be fixed which is applied to the DL signal of the user terminal to which the notification information is notified.

(Radio Communication System)

A configuration of a radio communication system according to one Embodiment of the present invention will be described below. In the radio communication system, the radio communication methods according to the invention are applied. In addition, the radio communication methods of the above-mentioned Embodiment may be applied alone, or may be applied in combination thereof. In addition, the same component is assigned with the same reference numeral to omit redundant descriptions.

Figure 11:
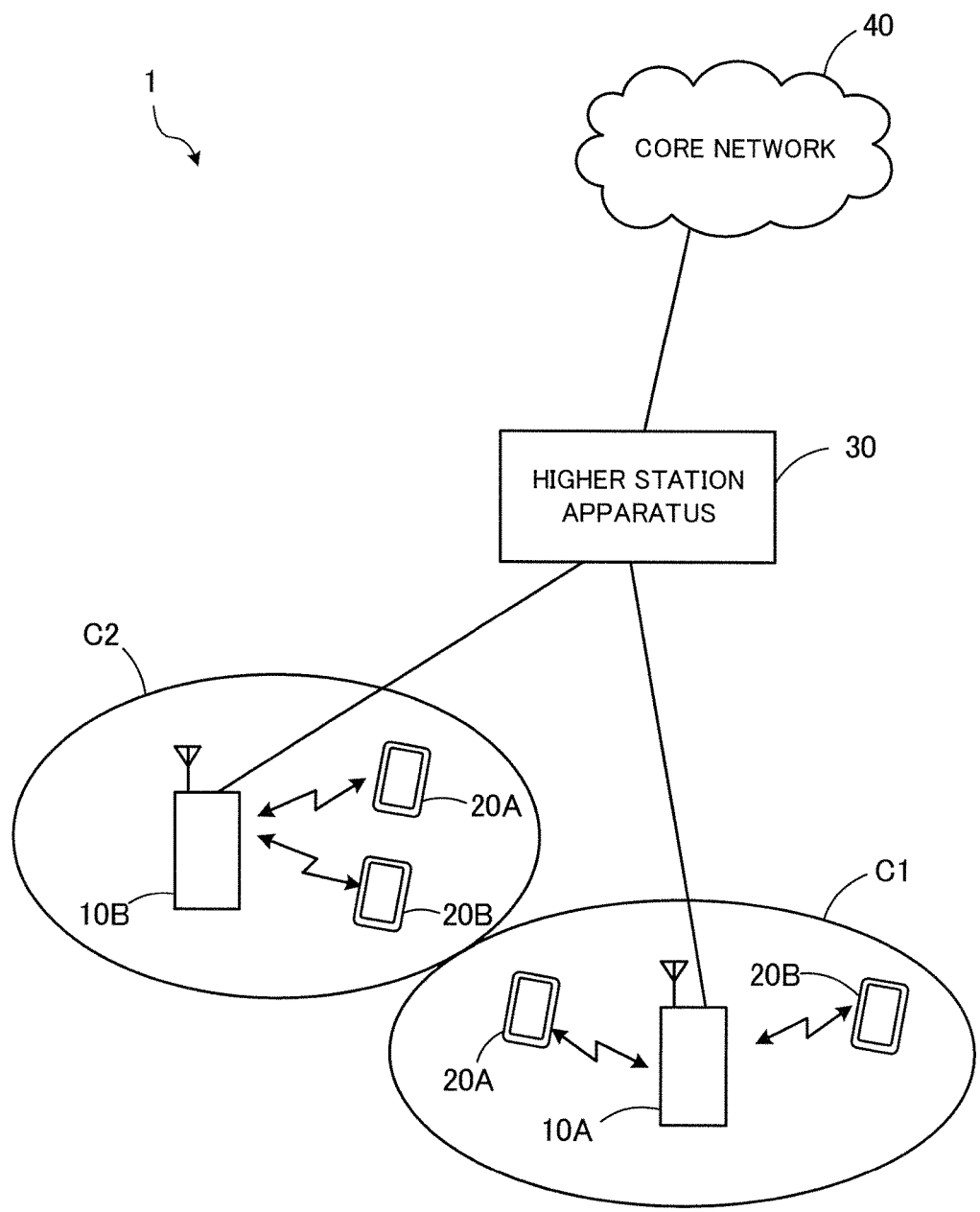
FIG. 11 is a diagram illustrating one example of a schematic configuration of a radio communication system according to this Embodiment.

FIG. 11 is a diagram illustrating one example of a schematic configuration of the radio communication system according to one Embodiment of the present invention. In addition, the radio communication system 1 may be called SUPER 3G, LTE-A (LTE-Advanced), IMT-Advanced, 4G, 5G, FRA (Future Radio Access) and the like.

The radio communication system 1 illustrated in FIG. 11 includes radio base stations 10 (10A, 10B), and a plurality of user terminals 20 (20A, 20B) that communicate with the radio base station 10. The radio base stations 10 are connected to a higher station apparatus 30, and are connected to a core network 40 via the higher station apparatus 30.

The radio base station 10 may be a macro base station, collection node, eNodeB (eNB), transmission/reception point and the like for forming a macro cell, or may be a small base station, micro-base station, pico-base station, femto-base station, Home eNodeB (HeNB), RRH (Remote Radio Head), transmission/reception point and the like for forming a small cell. Further, the radio base stations 10 may be subjected to wired connection (optical fiber, X2 interface and the like) or wireless connection.

Each user terminal 20 is capable of communicating with the radio base stations 10 in cells C1, C2, respectively. Each user terminal 20 is a terminal supporting various communication schemes such as LTE and LTE-A, and may include a fixed communication terminal, as well as the mobile communication terminal.

For example, the higher station apparatus 30 includes an access gateway apparatus, Radio Network Controller (RNC), Mobility Management Entity (MME) and the like, but is not limited thereto.

In the radio communication system 1, as radio access schemes, NOMA (Non-Orthogonal Multiple Access) is applied on downlink, and SC-FDMA (Single Carrier Frequency Division Multiple Access) is applied on uplink. Further, OFDMA (Orthogonal Frequency Division Multiple Access) may be applied on downlink.

Further, NOMA and OFDMA may be combined on downlink. In addition, uplink and downlink radio access schemes are not limited to the combination of the schemes. For example, techniques that are techniques (MUST: Multiuser Superposition Transmission) for multiplexing signals to a plurality of user terminals into the same radio resource to transmit and that are techniques other than NOMA may be applied on downlink.

NOMA is a multicarrier transmission scheme for dividing a frequency band into a plurality of narrow frequency bands (subcarriers, sub-bands or the like), and performing non-orthogonal multiplexing on signals of user terminals 20 with different transmit power for each sub-band, and OFDMA is a multicarrier transmission scheme for dividing a frequency band into a plurality of sub-bands, and performing orthogonal multiplexing on signals of user terminals 20 for each sub-band to perform communication. SC-FDMA is a single-carrier transmission scheme for dividing a system bandwidth into bands comprised of a single or contiguous resource blocks for each terminal so that a plurality of user terminals 20 uses mutually different bands, and thereby reducing interference among user terminals. In addition, NOMA and/or OFDMA may be used in a wideband, or may be used for each sub-band.

Further, in the radio communication system 1, the radio base station 10 and user terminal 20 perform communication obtained by combining NOMA and MIMO. For example, signals of a plurality of streams are subjected to power multiplexing.

Described herein are communication channels used in the radio communication system 1. The downlink communication channels include a downlink shared data channel (PDSCH: Physical Downlink Shared Channel) shared by user terminals 20, broadcast channel (PBCH: Physical Broadcast Channel), downlink L1/L2 control channels (e.g. PDCCH, EPDCCH, PCFICH, PHICH) and the like. User data, higher layer control information, SIB (System Information Block) and the like are transmitted on the PDSCH. Further, MIB (Master Information Block) is transmitted on the PBCH.

The downlink control information (DCI) including scheduling information of the PDSCH and PUSCH is transmitted on the PDCCH (Physical Downlink Control Chanel). The EPDCCH is frequency division multiplexed with the PDSCH (downlink shared data channel) to be used in transmitting the DCI and the like as the PDCCH. The number of OFDM symbols used in the PDCCH is transmitted on the PCFICH (Physical Control Format Indicator Channel). A receipt confirmation signal (e.g. ACK/NACK) of HARQ (Hybrid ARQ) for the PUSCH is transmitted on the PHICH (Physical Hybrid-ARQ Indicator Channel).

Further, the uplink communication channels include the uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data and higher layer control information is transmitted on the PUSCH. Further, radio quality information (CQI: Channel Quality Indicator) of downlink, receipt conformation signal and the like are transmitted on the PUCCH. A random access preamble to establish connection with the cell is transmitted on the PRACH.

In the radio communication system 1, transmitted as the downlink reference signal are the Cell-specific Reference Signal (CRS), Channel State Information-Reference Signal (CSI-RS), DeModulation Reference Signal (DMRS) and the like. Further, in the radio communication system 1, transmitted as the uplink reference signal are a Sounding Reference Signal (SRS), DeModulation Reference Signal (DMRS) and the like. In addition, the DMRS may be called a UE-specific Reference Signal. Further, the reference signal to transmit is not limited thereto.

(Radio Base Station)

Figure 12:
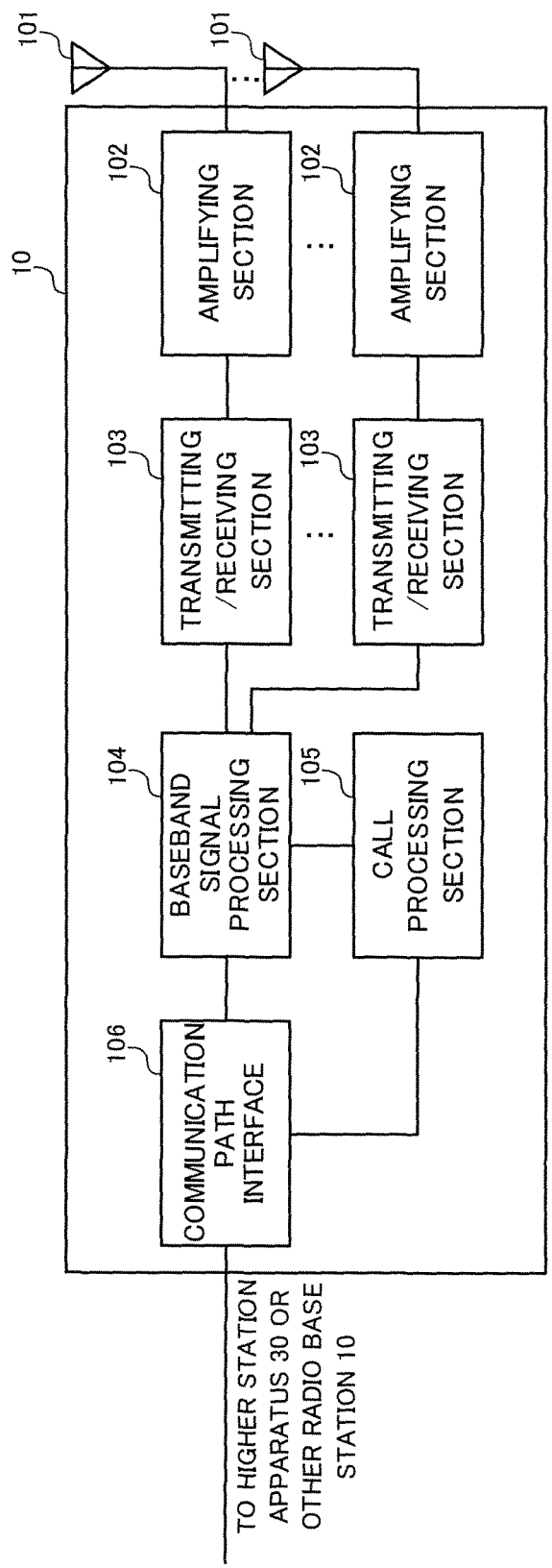
FIG. 12 is a diagram illustrating one example of an entire configuration of a radio base station according to this Embodiment.

FIG. 12 is a diagram illustrating one example of an entire configuration of the radio base station according to one Embodiment of the present invention. The radio base station 10 is provided with a plurality of transmission/reception antennas 101, amplifying sections 102, transmission/reception sections 103, baseband signal processing section 104, call processing section 105, and transmission path interface 106. In addition, with respect to each of the transmission/reception antenna 101, amplifying section 102, and transmission/reception section 103, the radio base station is essentially configured to include at least one or more.

User data to transmit to the user terminal 20 from the radio base station 10 on downlink is input to the baseband signal processing section 104 from the higher station apparatus 30 via the transmission path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g. transmission processing of HARQ (Hybrid Automatic Repeat reQuest)), scheduling, transmission format selection, channel coding, Inverse Fast Fourier Transform (IFFT) processing, and precoding processing to transfer to the transmission/reception sections 103. Further, also concerning a downlink control signal, the section 104 performs transmission processing such as channel coding and Inverse Fast Fourier Transform on the signal to transfer to the transmission/reception sections 103.

Each of the transmission/reception sections 103 converts the baseband signal, which is subjected to precoding (multiplied by a precoding matrix) for each antenna and is output from the baseband signal processing section 104, into a signal with a radio frequency band to transmit. The radio-frequency signal subjected to frequency conversion in the transmission/reception section 103 is amplified in the amplifying section 102, and is transmitted from the transmission/reception antenna 101. The transmission/reception section 103 is capable of being comprised of a transmitter/receiver, transmission/reception circuit or transmission/reception apparatus explained based on common recognition in the technical field according to the present invention. In addition, the transmission/reception section 103 may be comprised as an integrated transmission/reception section, or may be comprised of a transmission section and reception section.

On the other hand, for uplink signals, radio-frequency signals received in the transmission/reception antennas 101 are amplified in the amplifying sections 102. The transmission/reception section 103 receives the uplink signal amplified in the amplifying section 102. The transmission/reception section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the transmission path interface 106. The call processing section 105 performs call processing such as setting and release of a communication channel, state management of the radio base station 10, and management of radio resources.

The transmission path interface 106 transmits and receives signals to/from the higher station apparatus 30 via a predetermined interface. Further, the transmission path interface 106 may transmit and receive signals (backhaul signaling) to/from an adjacent radio base station 10 via an inter-base station interface (e.g. optical fiber in conformity with CPRI (Common Public Radio Interface), X2 interface).

Figure 13:
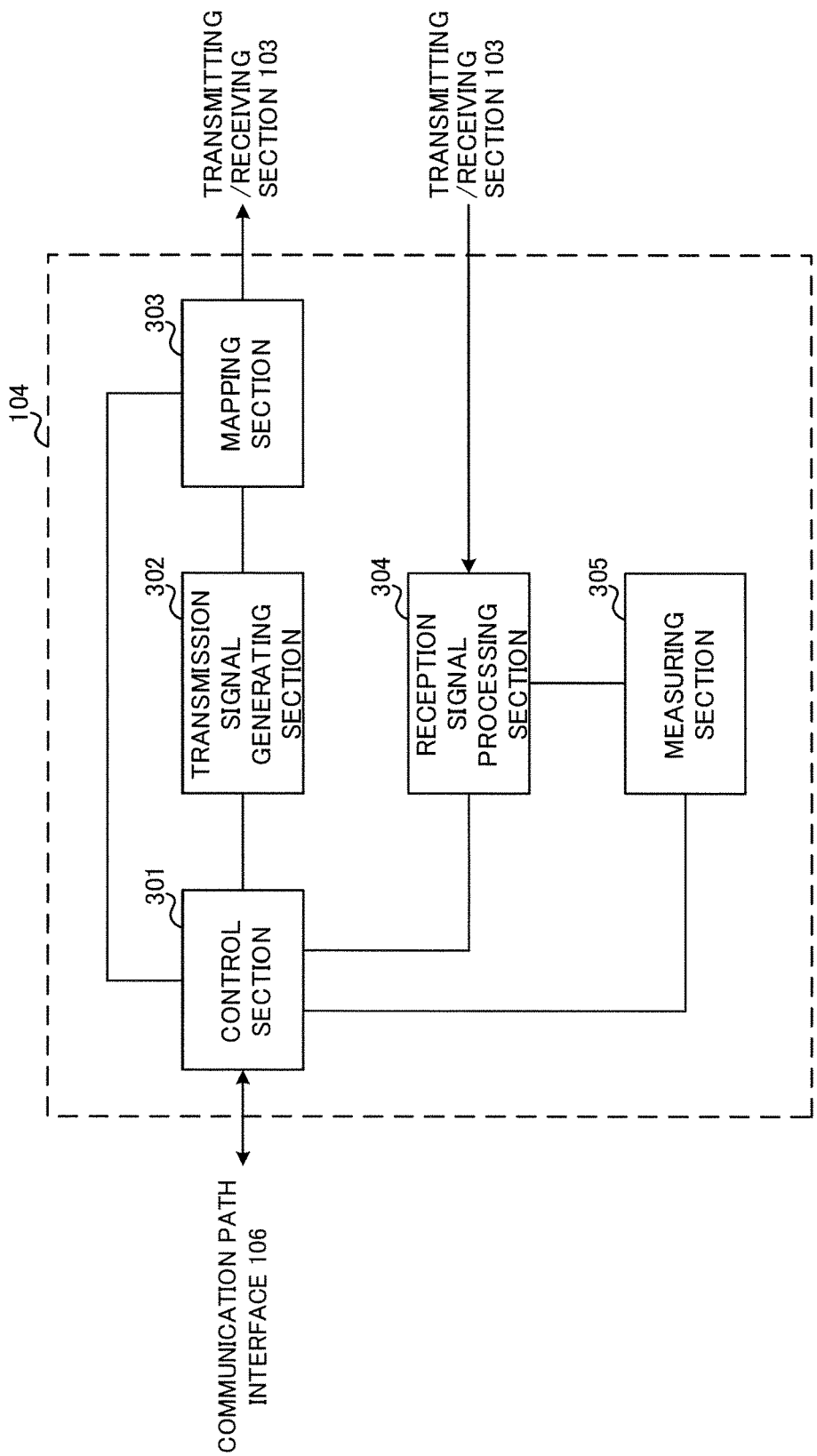
FIG. 13 is a diagram illustrating one example of a function configuration of the radio base station according to this Embodiment.

FIG. 13 is a diagram illustrating one example of a function configuration of the radio base station according to one Embodiment of the present invention. In addition, FIG. 13 mainly illustrates function blocks of a characteristic portion according to one Embodiment of the invention, and the radio base station 10 is assumed to have other function blocks required for radio communication. As illustrated in FIG. 13, the baseband signal processing section 104 is provided with a control section (scheduler) 301, transmission signal generating section 302, mapping section 303, received signal processing section 304, and measurement section 305.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302, and assignment of signals by the mapping section 303. Further, the control section 301 controls reception processing of signals by the received signal processing section 304, and measurement of signals by the measurement section 305.

The control section 301 controls scheduling (e.g. resource allocation) of system information, a downlink data signal transmitted on the PDSCH and downlink control signal transmitted on the PDCCH and/or EPDCCH. Further, the control section 301 controls scheduling of a synchronization signal and downlink reference signals such as the CRS, CSI-RS and DMRS.

Further, the control section 301 controls scheduling of an uplink data signal transmitted on the PUSCH, uplink control signal (e.g. receipt conformation signal (HARQ-ACK)) transmitted on the PUCCH and/or the PUSCH, random access preamble transmitted on the PRACH, uplink reference signal and the like.

The control section 301 sets the multiplexing power ratio for each stream. Further, when DL signals of a first user terminal and second user terminal are subjected to power multiplexing, the control section 301 controls to notify the first user terminal of the notification information indicative of at least the multiplexing power ratio for each stream. Specifically, the section controls to notify the user terminal that is an interference-imposed UE of the notification information as described in the above-mentioned Aspects 1 to 4.

Further, based on the CQI transmitted from each user terminal 20 as feedback, the control section 301 may control the MCS applied to the downlink signal to each user terminal 20. Furthermore, based on the RI transmitted from each user terminal 20 as feedback, the control section 301 controls the Rank (the number streams) applied to the downlink signal to each user terminal 20. Such information is transmitted as feedback for each stream.

Based on instructions from the control section 301, the transmission signal generating section 302 generates downlink signals to output to the mapping section 303. The transmission signal generating section 302 is capable of being comprised of a signal generator, signal generating circuit or signal generating apparatus explained based on the common recognition in the technical field according to the present invention. Further, the transmission signal generating section 302 is capable of actualizing the data buffer section, turbo coding section, data modulation section, multiplying section, power adjusting section, non-orthogonal multiplexing section and the like in FIG. 2.

The transmission signal generating section 302 performs modulation•coding on the downlink signal to each user terminal 20 with the MCS determined by the control section 301. Further, the transmission signal generating section 302 multiplies each of the downlink signals to pairing terminals by the precoding matrix determined by the control section 301.

Based on instructions from the control section 301, the mapping section 303 maps the downlink signal generated in the transmission signal generating section 302 to predetermined radio resources to output to the transmission/reception section 103. Further, the mapping section 303 performs non-orthogonal multiplexing (power multiplexing) on the downlink signals to the pairing terminals determined by the control section 301 to output to the transmission/reception section 103. The mapping section 303 is capable of being comprised of a mapper, mapping circuit or mapping apparatus explained based on the common recognition in the technical field according to the present invention. The mapping section 303 is capable of actualizing the multiplexing section in FIG. 3.

The received signal processing section 304 performs reception processing (e.g. demapping, demodulation, decoding and the like) on the received signal input from the transmission/reception section 103. Herein, for example, the received signal is an uplink signal (uplink control signal, uplink data signal, uplink reference signal and the like) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs information decoded by the reception processing to the control section 301. Further, the received signal processing section 304 outputs the received signal and signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, the measurement section 305 may measure received power (e.g. RSRP (Reference Signal Received Power)), received quality (e.g. RSRQ (Reference Signal Received Quality)), channel state and the like of the received signal. The measurement result may be output to the control section 301.

(User Terminal)

Figure 14:
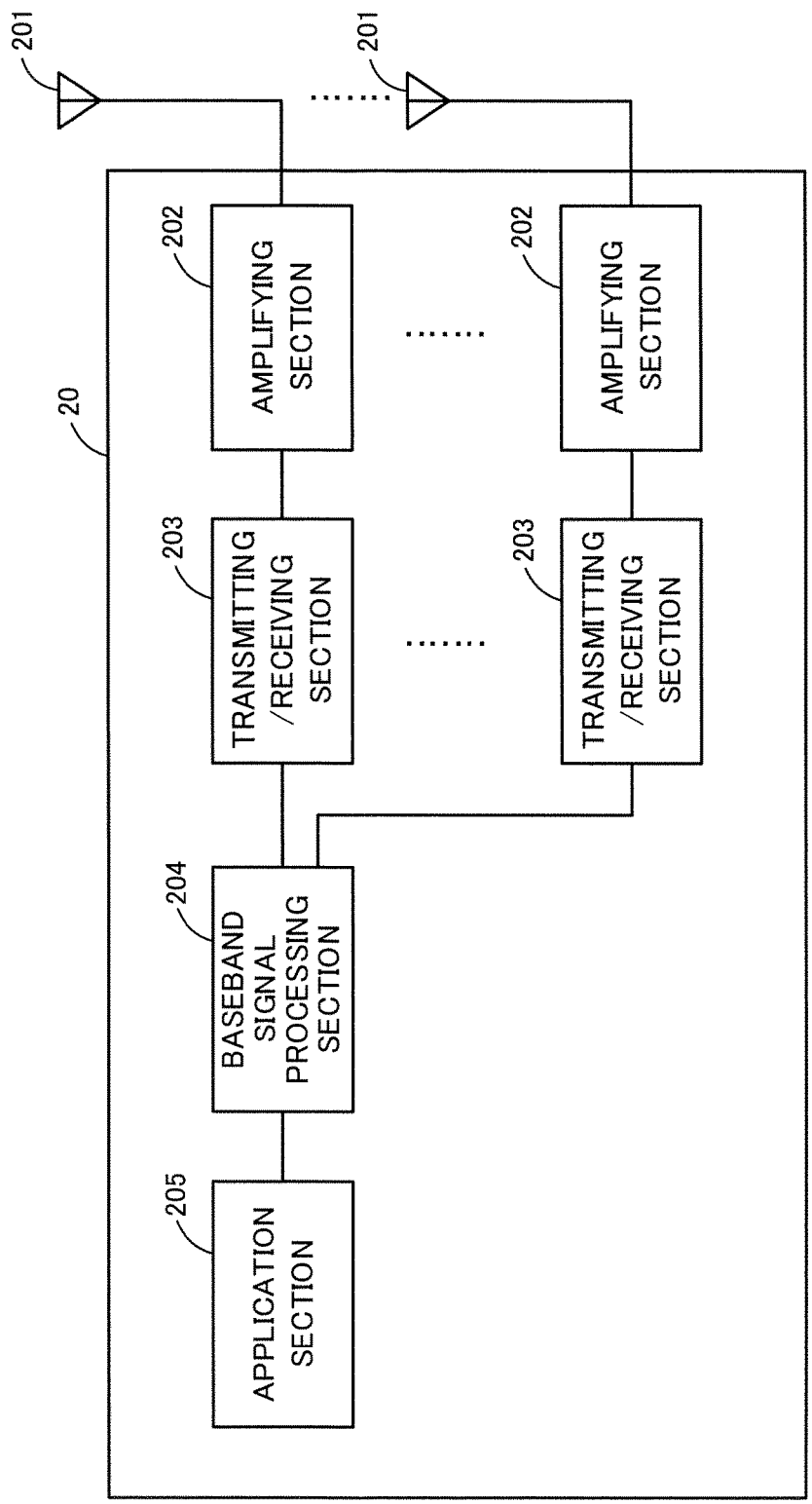
FIG. 14 is a diagram illustrating one example of an entire configuration of a user terminal according to this Embodiment.

FIG. 14 is a diagram illustrating one example of an entire configuration of the user terminal according to this Embodiment. The user terminal 20 is provided with a plurality of transmission/reception antennas 201, amplifying sections 202, transmission/reception sections 203, baseband signal processing section 204, and application section 205. In addition, with respect to each of the transmission/reception antenna 201, amplifying section 202, and transmission/ reception section 203, the user terminal is essentially configured to include at least one or more.

Radio-frequency signals received in the transmission/ reception antennas 201 are respectively amplified in the amplifying sections 202. Each of the transmission/reception sections 203 receives the downlink signal amplified in the amplifying section 202. The transmission/reception section 203 performs frequency conversion on the received signal into a baseband signal to output to the baseband signal processing section 204. The transmission/reception section 203 is capable of being comprised of a transmitter/receiver, transmission/reception circuit or transmission/reception apparatus explained based on the common recognition in the technical field according to the present invention. In addition, the transmission/reception section 203 may be comprised as an integrated transmission/reception section, or may be comprised of a transmission section and reception section.

The transmission/reception section 203 is capable of receiving information on transmit power applied to the downlink signal to the terminal from the radio base station 10, and further capable of receiving also the notification information as described above. For example, the section is capable of receiving the notification information described in the above-mentioned Aspects 1 to 4.

The baseband signal processing section 204 performs FFT processing, error correcting decoding, reception processing of retransmission control and the like on the input baseband signal. User data on downlink is transferred to the application section 205. The application section 205 performs processing concerning layers higher than physical layer and MAC layer, and the like. Further, among the downlink data, broadcast information is also transferred to the application section 205.

On the other hand, for user data on uplink, the data is input to the baseband signal processing section 204 from the application section 205. The baseband signal processing section 204 performs transmission processing of retransmission control (e.g. transmission processing of HARQ), channel coding, precoding, Discrete Fourier Transform (DFT) processing, IFFT processing and the like to transfer to the transmission/reception sections 203. Each of the transmission/reception sections 203 converts the baseband signal output from the baseband signal processing section 204 into a signal with a radio frequency band to transmit. The radio-frequency signals subjected to frequency conversion in the transmission/reception sections 203 are amplified in the amplifying sections 202, and transmitted from the transmission/reception antennas 201, respectively.

Figure 15:
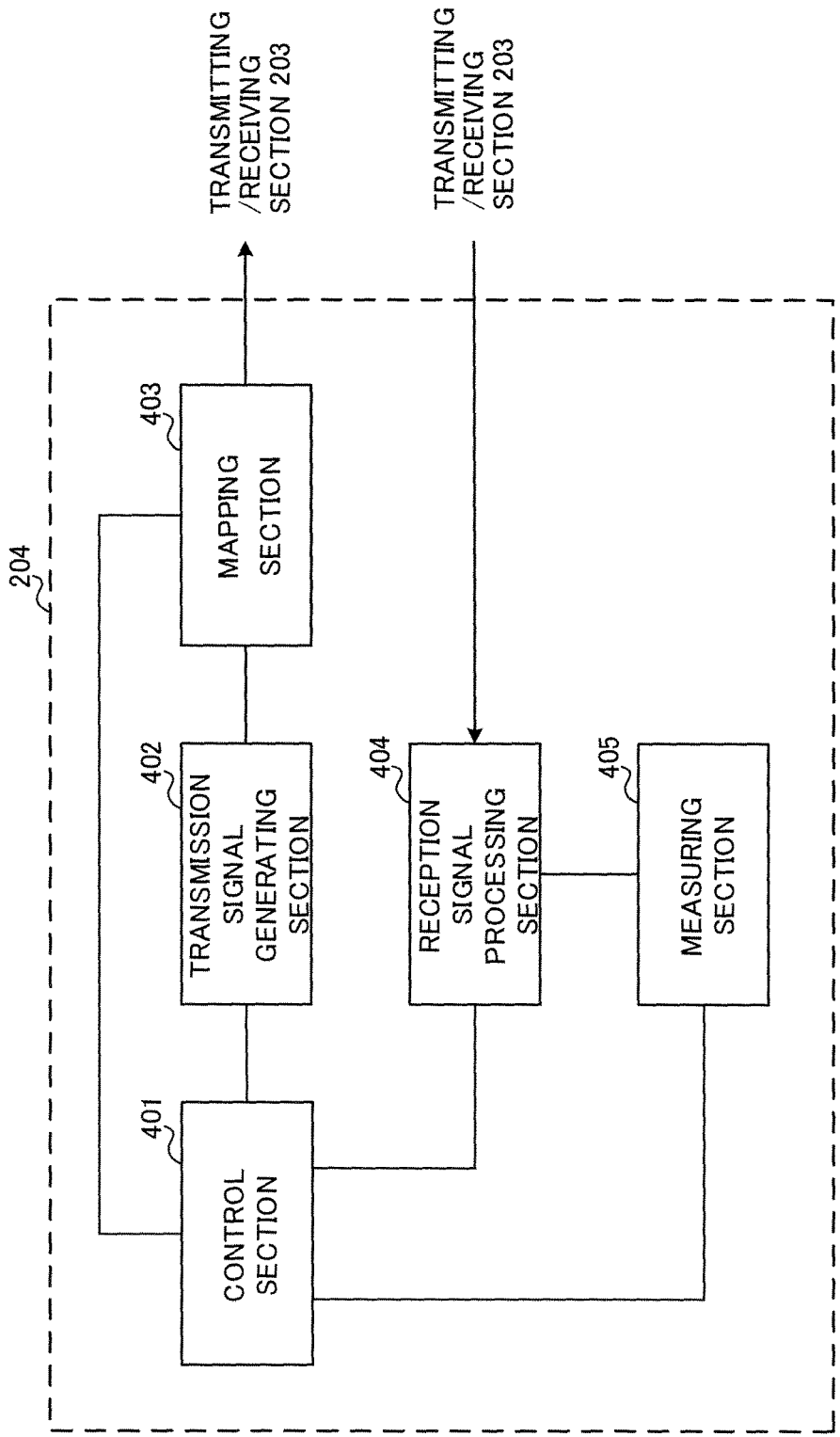
FIG. 15 is a diagram illustrating one example of a function configuration of the user terminal according to this Embodiment.

FIG. 15 is a diagram illustrating one example of a function configuration of the user terminal according to this Embodiment. In addition, FIG. 15 mainly illustrates function blocks of a characteristic portion in this Embodiment, and the user terminal 20 is assumed to have other function blocks required for radio communication. As illustrated in FIG. 15, the baseband signal processing section 204 that the user terminal 20 has is provided with a control section 401, transmission signal generating section (generating section) 402, mapping section 403, received signal processing section 404, and measurement section 405.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, and assignment of signals by the mapping section 403. Further, the control section 401 controls reception processing of signals by the received signal processing section 404, and measurement of signals by the measurement section 405. In addition, the control section 401 is capable of constituting a part of the generating section according to the present invention.

The control section 401 acquires the downlink control signal (signal transmitted on the PDCCH/EPDCCH) and downlink data signal (signal transmitted on the PDSCH) transmitted from the radio base station 10 from the received signal processing section 404. Based on the downlink control signal, a result of judging necessity of retransmission control to the downlink data signal and the like, the control section 401 controls generation of the uplink control signal (e.g. receipt conformation signal (HARQ-ACK) and the like) and uplink data signal.

The control section 401 is capable of controlling so as to demodulate the signal for each stream based on the received notification information. For example, based on the notification information, the section is capable of controlling so as to remove the signal to the interference UE and demodulate the signal to the terminal.

Based on instructions from the control section 401, the transmission signal generating section 402 generates uplink signals to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal concerning the receipt conformation signal (HARQ-ACK) and channel state information (CSI). When the transmission signal generating section 402 is instructed to generate CSI on a predetermined candidate for transmit power from the control section 401, the section 402 selects the CSI to generate. Further, based on instructions from the control section 401, the transmission signal generating section 402 generates the uplink data signal. For example, when a UL grant is included in the downlink control signal notified from the radio base station 10, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmission/reception section 203. The mapping section 403 is capable of being comprised of a mapper, mapping circuit or mapping apparatus explained based on the common recognition in the technical field according to the present invention.

The received signal processing section 404 performs reception processing (e.g. demapping, demodulation, decoding and the like) on the received signal input from the transmission/reception section 203. Herein, for example, the received signal is the downlink signal (downlink control signal, downlink data signal, downlink reference signal and the like) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the reception section according to the present invention.

Further, the received signal processing section 404 is capable of actualizing the MMSE section, demodulation•decoding section, interference replica generating section, interference cancellation section and the like in FIG. 6. In addition, FIG. 6 illustrates the example of using the SIC type interference canceller such as the CWIC, but the invention is not limited thereto. The received signal processing section 404 is capable of also actualizing configurations using the R-ML and another scheme as the interference canceller.

In the case of receiving information on transmit power applied to the downlink signal to the terminal from the radio base station 10, the received signal processing section 404 is capable of performing reception processing such as interference cancellation based on the information.

The received signal processing section 404 outputs information decoded by the reception processing to the control section 401. For example, the received signal processing section 404 outputs the broadcast information, system information, higher layer control information, DCI and the like to the control section 401. Further, the received signal processing section 404 outputs the received signal and signal subjected to the reception processing to the measurement section 405.

The measurement section 405 performs measurement on the received signal. The measurement section 405 is capable of being comprised of a measurement device, measurement circuit or measurement apparatus explained based on the common recognition in the technical field according to the present invention.

For example, the measurement section 405 may measure received power (e.g. RSRP (Reference Signal Received Power)), received quality (e.g. RSRQ (Reference Signal Received Quality)), channel state (propagation environment) and the like of the received signal. Further, the measurement section 405 calculates the CQI for each wideband and/or for each sub-band. Herein, the measurement section 405 may calculate a CQI of the case (or case of assuming maximum transmit power as downlink transmit power) of assuming that OMA is applied to the downlink signal, or may calculate a CQI of the case of assuming maximum downlink transmit power except P among a plurality of set candidates for transmit power.

The measurement result by the measurement section 405 is output to the control section 401. The measurement section 405 is capable of actualizing the channel estimation section in FIG. 3. In addition, the measurement section 405 may perform the above-mentioned measurement using one of the CRS, CSI-RS and other signal multiplexed into the received signal, or combination thereof.

In addition, in the above-mentioned Embodiment, as one example, the user terminal is assumed to receive the downlink signal using the NOMA scheme, but the invention is not limited thereto. As long as the downlink signal received in the user terminal is a downlink signal multiplexed (e.g. power-multiplexed) into the same radio resources as those of a downlink signal to another user terminal, the downlink signal may be any signal.

(Hardware Configuration)

In addition, the block diagrams used in explanation of the above-mentioned Embodiment illustrate blocks on a function-by-function basis. These function blocks (configuration section) are actualized by any combination of hardware and/or software. Further, the means for actualizing each function block is not limited particularly. In other words, each function block may be actualized by a single physically combined apparatus, or two or more physically separated apparatuses are connected by cable or radio, and each function block may be actualized by a plurality of these apparatuses.

Figure 16:
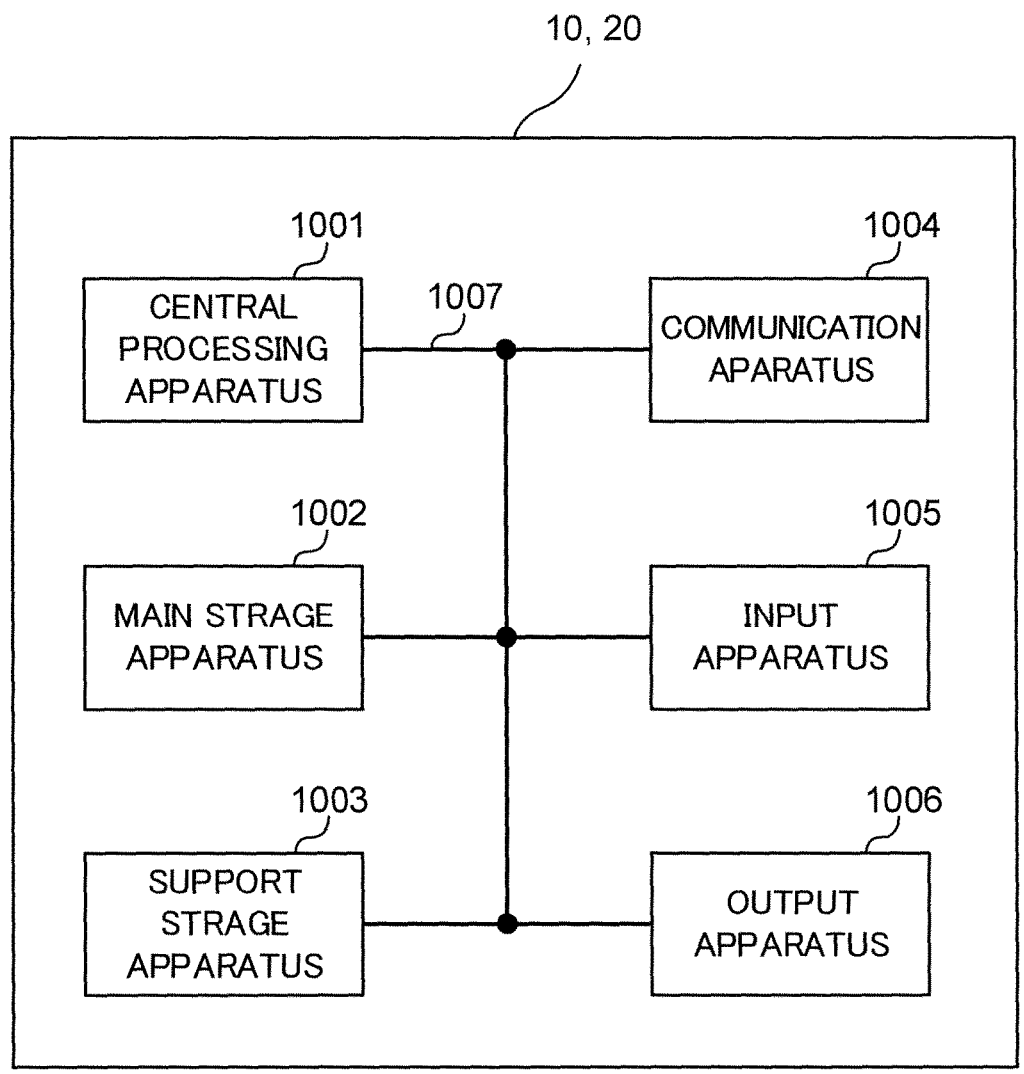
FIG. 16 is a diagram illustrating one example of a hardware configuration of the radio base station and user terminal according to this Embodiment.

For example, each of the radio base station, user terminal and the like in one Embodiment of the present invention may function as a computer that performs the processing of the radio communication method of the invention. FIG. 16 is a diagram illustrating one example of a hardware configuration of each of the radio base station and user terminal according to one Embodiment of the invention. Each of the radio base station 10 and user terminal 20 as described above may be physically configured as a computer apparatus including a central processing apparatus (processor) 1001, main storage apparatus (memory) 1002, auxiliary storage apparatus 1003, communication apparatus 1004, input apparatus 1005, output apparatus 1006, bus 1007 and the like. In addition, in the following description, it is possible to replace the letter of "apparatus" with a circuit, device, unit and the like to read.

Each function in the radio base station 10 and user terminal 20 is actualized by the fact that predetermined software (program) is read on the hardware of the central processing apparatus 1001, main storage apparatus 1002 and the like, and that the central processing apparatus 1001 thereby performs computations, and controls communication by the communication apparatus 1004, and read and/or write of data in the main storage apparatus 1002 and auxiliary storage apparatus 1003.

For example, the central processing apparatus 1001 operates an operating system to control the entire computer. The central processing apparatus 1001 may be comprised of a processor (CPU: Central Processing Unit) including a control apparatus, computation apparatus, register, interface to a peripheral apparatus and the like. For example, the above-mentioned baseband signal processing section 104 (204), call processing apparatus 105 and the like may be actualized by the central processing apparatus 1001.

Further, the central processing apparatus 1001 reads the program, software module and data on the main storage apparatus 1002 from the auxiliary storage apparatus 1003 and/or communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the main storage apparatus 1002 to operate in the central processing apparatus 1001, and the other function blocks may be actualized similarly.

The main storage apparatus (memory) 1002 is a computer-readable storage medium, and for example, may be comprised of at least one of ROM (Read Only Memory), EPROM (Erasable Programmable ROM), RAM (Random Access Memory) and the like. The auxiliary storage apparatus 1003 is a computer-readable storage medium, and for example, may be comprised of at least one of a flexible disk, magneto-optical disk, CD-ROM (Compact Disc ROM), hard disk drive and the like.

The communication apparatus 1004 is hardware (transmission/reception device) to perform communication between computers via a wired and/or wireless network, and for example, is also referred to as a network device, network controller, network card, communication module and the like. For example, the transmission/reception antenna 101 (201), amplifying section 102 (202), transmission/reception section 103 (203), transmission path interface 106 and the like as described above may be actualized by the communication apparatus 1004.

The input apparatus 1005 is an input device (e.g. keyboard, mouse and the like) that receives input from the outside. The output apparatus 1006 is an output device (e.g. display, speaker and the like) that performs output to the outside. In addition, the input apparatus 1005 and output apparatus 1006 may be an integrated configuration (e.g. touch panel).

Further, each apparatus of the central processing apparatus 1001, main storage apparatus 1002 and the like is connected on the bus 1007 to communicate information. The bus 1007 may be comprised of a single bus, or may be comprised of different buses between apparatuses. In addition, the hardware configuration of each of the radio base station 10 and user terminal 20 may be configured to include a single or a plurality of apparatuses illustrated in the figure, or may be configured without including a part of apparatuses.

Furthermore, each of the radio base station 10 and user terminal 20 may be configured by including hardware such as ASIC (Application Specific Integrated Circuit), PLD (Programmable Logic Device), and FPGA (Field Programmable Gate Array), or a part or the whole of each function block may be actualized by the hardware.

In addition, the term explained in the present Description and/or the term required to understand the present Description may be replaced with a term having the same or similar meaning. For example, the channel and/or symbol may be a signal (signaling). Further, the signal may be a message. Furthermore, a component carrier (CC) may be called a cell, frequency carrier, carrier frequency and the like.

Further, the information, parameter and the like explained in the present Description may be expressed by an absolute value, may be expressed by a relative value from a predetermined value, or may be expressed by another corresponding information. For example, the radio resource may be indicated by a predetermined index.

The information, signal and the like explained in the present Description may be represented by using any one of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, software, command, information and the like may be transmitted and received via a transmission medium. For example, when software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

Each Aspect/Embodiment explained in the present Description may be used alone, may be used in combination, or may be switched and used according to execution. Further, notification of predetermined information (e.g. notification of "being X") is not limited to notification that is performed explicitly, and may be performed implicitly (e.g. notification of the predetermined information is not performed.)

Notification of information is not limited to the Aspect/Embodiment explained in the present Description, and may be performed by another method. For example, the notification of information may be performed by physical layer signaling (e.g. DCI (Downlink Control Information), UCI (Uplink Control Information)), higher layer signaling (e.g. RRC (Radio Resource Control) signaling, broadcast information (MIB (Master Information Block), SIB (System Information Block)), MAC (Medium Access Control) signaling), another signal or combination thereof. Further, the RRC signaling may be called an RRC message, and for example, may be an RRC Connection Setup message, RRC Connection Reconfiguration message and the like.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802. 11 (Wi-Fi (Registered Trademark)), IEEE 802. 16 (WiMAX (Registered Trademark)), IEEE 802. 20, UWB (Ultra-WideBand), Bluetooth (Registered Trademark), system using another proper system and/or the next-generation system extended based thereon.

With respect to the processing procedure, sequence, flowchart and the like of each Aspect/Embodiment explained in the present Description, unless there is a contradiction, the order may be exchanged. For example, with respect to the methods explained in the present Description, elements of various steps are presented by illustrative order, and are not limited to the presented particular order.

As described above, the present invention is specifically described, but it is obvious to a person skilled in the art that the invention is not limited to the Embodiment described in the present Description. For example, each Embodiment as described above may be used alone, or may be used in combination. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The present application is based on Japanese Patent Application No. 2015-197119 filed on Oct. 2, 2015, entire content of which is expressly incorporated by reference herein.

The invention claimed is:

1. A radio base station comprising:
a transmitter that transmits DL signals to a first user terminal and a second user terminal, respectively, by superposing the DL signals onto a single or multiple layers; and
a processor that provides notification information including a power ratio of the DL signals superposed only to either user terminal of the first user terminal and the second user terminal that is nearer to the radio base station or that has a higher reception Signal to Interference plus Noise Ratio (SINR),
wherein when either of the first user terminal and the second user terminal is not provided with the notification information, a modulation and coding scheme of DL signals for the user terminal is fixed.

2. The radio base station according to claim 1, wherein when the DL signals are transmitted on the multiple layers, the notification information includes a power ratio per layer.

3. The radio base station according to claim 1, wherein the notification information is provided by using a downlink control signal.

4. The radio base station according to claim 2, wherein the notification information is provided by using a downlink control signal.

5. A user terminal comprising:
a receiver that, when the user terminal is nearer to a radio base station than another user terminal or has a higher reception Signal to Interference plus Noise Ratio (SINR) than the other user terminal, receives, on a single or multiple layers, DL signals and notification information, the DL signals being superposed signals for the user terminal and the other user terminal, and the notification information including a power ratio of the DL signals superposed and being provided only to the user terminal and not to the other user terminal; and
a processor that performs reception processing of the DL signals by using the notification information,
wherein when either one of the user terminal and the other user terminal is not provided with the notification information, a modulation and coding scheme of DL signals for the one user terminal is fixed.

6. A radio communication method for a radio base station, comprising:
transmitting DL signals to a first user terminal and a second user terminal, respectively, by superposing the DL signals onto a single or multiple layers; and
providing notification information including a power ratio of the DL signals superposed only to either user terminal of the first user terminal and the second user terminal that is nearer to the radio base station or that has a higher reception Signal to interference plus Noise Ratio (SINR),
wherein when either of the first user terminal and the second user terminal is not provided with the notification information, a modulation and coding scheme of DL signals for the user terminal is fixed.

* * * * *